United States Patent
Yoon et al.

(10) Patent No.: US 8,879,684 B2
(45) Date of Patent: Nov. 4, 2014

(54) TRUSS-REINFORCED SPACER GRID AND METHOD OF MANUFACTURING THE SAME

(75) Inventors: Kyung Ho Yoon, Daejeon (KR); Hyung Kyu Kim, Daejeon (KR); Jae Yong Kim, Daejeon (KR); Young Ho Lee, Daejeon (KR); Kang Hee Lee, Daejeon (KR); Tae Hyun Chun, Daejeon (KR); Wang Ki In, Daejeon (KR); Dong Seok Oh, Daejeon (KR); Chang Hwan Shin, Gyeonggi-do (KR); Kun Woo Song, Daejeon (KR); Ki Ju Kang, Jeollanam-do (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 819 days.

(21) Appl. No.: 12/849,431

(22) Filed: Aug. 3, 2010

(65) Prior Publication Data

US 2011/0051882 A1 Mar. 3, 2011

(30) Foreign Application Priority Data

Sep. 2, 2009 (KR) .................. 10-2009-0083081

(51) Int. Cl.
*G21C 3/352* (2006.01)
*G21C 3/34* (2006.01)
*G21C 3/356* (2006.01)

(52) U.S. Cl.
CPC .............. *G21C 3/352* (2013.01); *G21C 3/3424* (2013.01); *G21C 3/3566* (2013.01); *G21C 3/3416* (2013.01); *Y02E 30/40* (2013.01)
USPC .......................... 376/442; 376/445; 376/438

(58) Field of Classification Search
USPC .......................................... 376/462, 438, 445
See application file for complete search history.

(56) References Cited

U.S. PATENT DOCUMENTS

| | | | | |
|---|---|---|---|---|
| 3,837,397 | A | * | 9/1974 | Pettigrew ...................... 165/162 |
| 3,944,468 | A | * | 3/1976 | Duret et al. ................... 376/436 |
| 4,135,972 | A | * | 1/1979 | Anthony et al. .............. 376/442 |
| 4,933,138 | A | | 6/1990 | Mouesca et al. |
| 2003/0223529 | A1 | * | 12/2003 | de la Pena et al. ............ 376/272 |
| 2007/0165766 | A1 | * | 7/2007 | Aleshin et al. ................ 376/438 |

* cited by examiner

*Primary Examiner* — Jack W Keith
*Assistant Examiner* — Sean P Burke
(74) *Attorney, Agent, or Firm* — Bachman & LaPointe, P.C.

(57) ABSTRACT

A truss-reinforced spacer grid and a method of manufacturing the same are provided, in which truss members having a small diameter are woven to form a truss structure surrounded by an external plate, and the truss structure is joined to the external plate to thereby improve the strength of the mechanical structure. The truss-reinforced spacer grid includes a truss structure in which horizontal trusses formed by horizontally weaving a plurality of truss members are vertically disposed at regular intervals, and an external plate is joined with ends of the horizontal trusses and surrounds the truss structure.

21 Claims, 18 Drawing Sheets

12

12

TRUSS-REINFORCED SPACER GRID AND METHOD OF MANUFACTURING THE SAME

BACKGROUND OF THE INVENTION

1. Field of the Invention

The present invention relates, in general, to a truss-reinforced spacer grid and a method of manufacturing the same and, more particularly, to a truss-reinforced spacer grid having improved mechanical structural strength and thermal hydraulic performance and a method of manufacturing the same.

2. Description of the Related Art

Nuclear fuel assemblies are charged into the core of a pressurized water reactor. These nuclear fuel assemblies are composed of a plurality of fuel rods, into each of which a cylindrical uranium sintered compact (or a cylindrical uranium pellet) is inserted.

The fuel rods can be divided into two types, cylindrical and annular, depending on the shape. The fuel rods are structurally vulnerable, because the length is very long in relation to the outer diameter. In order to make up for this drawback, a plurality of supports are used.

FIG. 20 is a schematic front view illustrating a conventional nuclear fuel assembly having fuel rods. FIG. 21 is a schematic top plan view illustrating a conventional spacer grid. FIG. 22 is a perspective view illustrating a conventional spacer grid.

As illustrated in FIG. 20, the nuclear fuel assembly 100 includes fuel rods 110, guide tubes 120, spacer grids 150, an upper end fitting 160, and a lower end fitting 170.

Each fuel rod 110 is enclosed by a zirconium alloy cladding tube and has a structure in which the nuclear fission of a uranium sintered compact or a uranium pellet (not shown) generates high-temperature heat.

Each fuel rod 110 has upper and lower end plugs 130 and 140 coupled to lower and upper portions thereof so as to prevent inert gas which has been used to fill up the cladding tube thereof from leaking out.

The structure of the fuel rod 110 is considerably long compared to the diameter thereof. When a coolant flows through this structure having such a great elongation ratio, the fuel rod 110 responds by causing flow-induced vibrations.

Thus, in order to reduce these flow-induced vibrations, spacer grids 150 are installed in a predetermined section selected with respect to the entire length of the fuel rods 110, so that it is possible to reduce the vibrations of the fuel rods 110 caused by the flow of the coolant.

Meanwhile, in the spacer grid 150 as shown in FIGS. 21 and 22, contact portions between an inner grid plate and an outer grid plate, between the inner grid plates, or between the outer grid plates must be welded, and such welding forms beads which increase the magnitude of the pressure drop in the core region, and thus thermal hydraulic performance may become degraded.

Further, coolant mixing vanes are formed on the inner or outer grid plate for the purpose of mixing the coolant in the sub-channels where the coolant flows or between neighboring nuclear fuel assemblies. These coolant mixing vanes are another cause of the magnitude of the pressure drop in the core increasing. For this reason, although these coolant mixing vanes are supposed to improve the thermal hydraulic performance of the coolant, they may reduce cooling performance instead.

In addition, the spacer grid 150 undergoes a local buckling phenomenon at the outer shell (structurally, the weakest point) when a side receives an impact, so that it is possible to reduce the buckling strength of the entire spacer grid 150.

Furthermore, the thickness of the grid plate which forms the spacer grid 150, in the state where the pitch of the fuel rod 110 is fixed for the sake of performance of the nuclear function, is extremely restricted by this external condition.

In detail, a grid plate that is too thin may reduce the strength of the spacer grid 150. In contrast, a grid plate that is too thick may reduce the interval between the fuel rods 110 and increase the possibility of a departure from nucleate boiling due to contact being made between the fuel rods or may greatly reduce the performance of the fuel rod 110 due to excessively increasing the magnitude of the pressure drop.

Thus, the spacer grid 150 formed of the aforementioned grid plate makes it difficult to continue to solidly support the fuel rods 110 and to further enhance the thermal hydraulic performance.

SUMMARY OF THE INVENTION

Accordingly, the present invention has been made keeping in mind the above problems occurring in the related art, and embodiments of the present invention provide a truss-reinforced spacer grid and a method of manufacturing the same, in which truss members having a small diameter are woven to form a truss structure surrounded by an external plate, and the truss structure is joined to the external plate to thereby improve its mechanical structural strength.

Embodiments of the present invention provide a truss-reinforced spacer grid and a method of manufacturing the same, capable of supporting fuel rods thanks to the truss structure and striking a coolant to interwoven truss members, thereby imparting thermal hydraulic performance superior to when basing it on coolant mixing vanes.

According to an aspect of the present invention, there is provided a truss-reinforced spacer grid, which comprises: a truss structure in which horizontal trusses are formed by horizontally weaving a plurality of truss members and are vertically disposed at regular intervals; and, an external plate joined with ends of the horizontal trusses and surrounding the truss structure.

The truss structure may include vertical trusses, which are vertically fastened to vertically corresponding truss intersections of the horizontal trusses to vertically support the horizontal trusses at regular intervals.

The truss structure may include unit trusses, each of which has the shape of a hexagon in the center thereof and the shape of a triangle outside the corresponding sides of the hexagon.

The truss structure may support fuel rods inserted into the unit trusses.

The truss structure may include a guide tube hole into which a guide tube acting as a passage for a control rod is inserted.

The guide tube may be surrounded by a cylindrical sleeve, the sleeve and the guide tube being welded.

Each truss member may be formed of a wire.

Each truss member may be formed of a hollow cylindrical pipe.

The hollow cylindrical pipe may have an outer diameter of 0.5 mm to 2.0 mm.

Each truss member may have a linear shape.

Each truss member may have a circular shape curved at a predetermined curvature.

Each truss member may have an angled shape bent at a predetermined angle.

According to another aspect of the present invention, there is provided a method of manufacturing a truss-reinforced spacer grid, which comprises: a first step of horizontally weaving a plurality of truss members to form horizontal trusses; a second step of fastening vertical trusses to the horizontal trusses to form a truss structure; and a third step of joining ends of the horizontal trusses to an external plate surrounding the truss structure to form the truss-reinforced spacer grid.

The first step may include: a process of weaving the truss members to form unit trusses; and, a process of joining the unit trusses using brazing to form the horizontal trusses.

The second step may include: a process of vertically disposing the horizontal trusses at regular intervals; and, a process of vertically fastening the vertical trusses to vertically corresponding truss intersections of the horizontal trusses to form the truss structure.

The third step may include joining the horizontal trusses to the external plate using brazing.

The method further includes a fourth step of inserting a guide tube into the truss structure.

The fourth step may include: a process of forming a guide tube hole in the truss structure, the guide tube hole having a diameter greater than that of the guide tube; a process of inserting a cylindrical sleeve into the guide tube hole; and, a process of inserting the guide tube into the cylindrical sleeve and welding the sleeve and the guide tube.

The method may further include a fifth step of inserting fuel rods into the truss structure.

According to the truss-reinforced spacer grid and the method of manufacturing the same as described above, the interwoven truss structure minimizes the deformation resulting from a compression such as lateral impact load, withstands a load, and has a post-buckling behavior, i.e. a behavior thereof after buckling occurs, in which the strength is increased rather than reduced. As such, the truss-reinforced spacer grid has considerably high impact resistance compared to a conventional spacer grid constituted of grid plates, and thus even when an earthquake-proof design criterion based on an earthquake and a loss-of-coolant accident is increased to 0.3 G, it is possible to secure sufficient impact strength to ensure better structural soundness.

Further, the truss members constituting the truss structure vary the coolant flow which remarkably increases the turbulence of the coolant introduced from the upstream side to more effectively transmit heat generated by nuclear fission, and thus increase thermal hydraulic performance. The interwoven truss members minimize interruption of the coolant in an axial or height direction, and thus the magnitude of the pressure drop does not greatly increase.

In addition, unlike a conventional structure in which all the contact portions of a grid plate are welded, the interwoven truss members are brazed once, so that it is possible to significantly reduce the cost of production.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
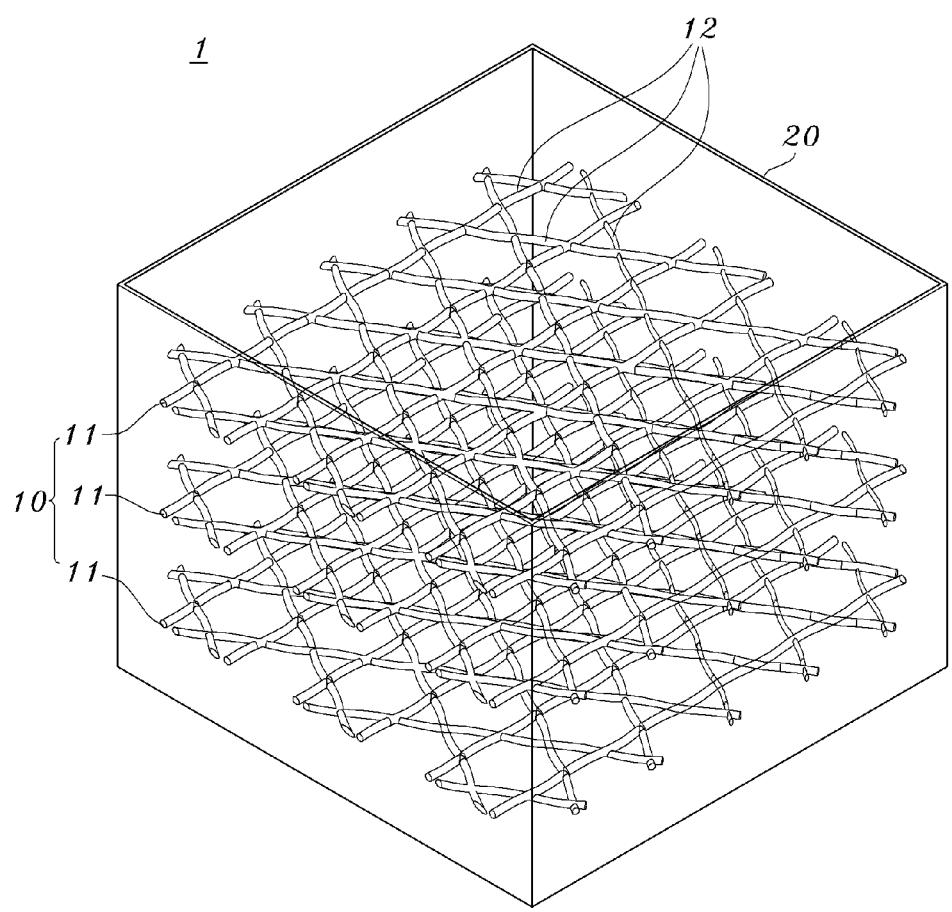
FIG. 1 is a schematic perspective view illustrating a truss-reinforced spacer grid according to an exemplary embodiment of the present invention.

An exemplary embodiment of the invention will now be described in greater detail with reference to the accompanying drawings. Wherever possible, the same reference numerals will be used throughout the drawings and the description to refer to the same or like parts. In the following description of the present invention, a detailed description of known functions and configurations incorporated herein will be omitted when it may make the subject matter of the present invention rather unclear.

Figure 3:
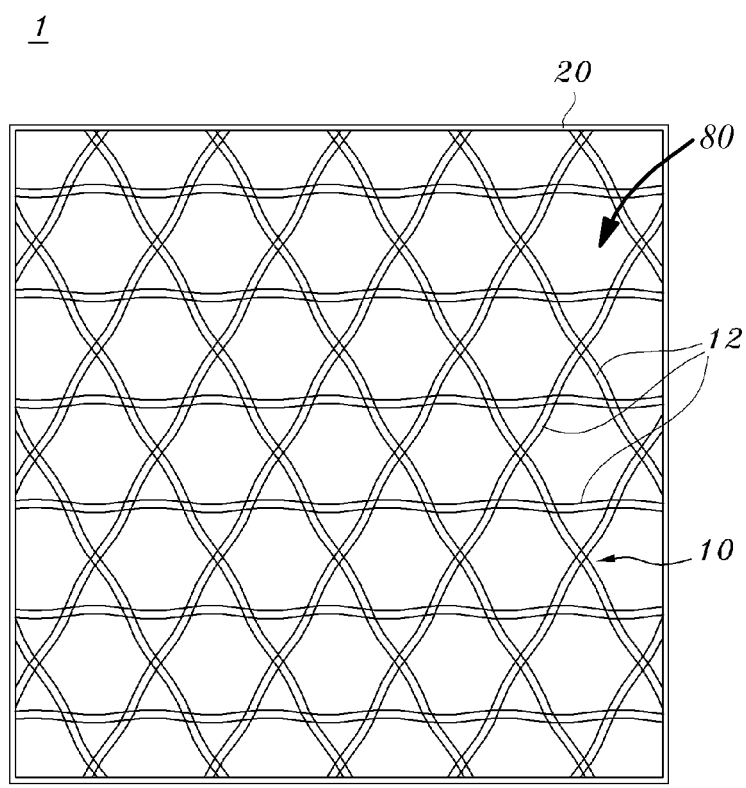
FIG. 3 is a top plan view illustrating a truss-reinforced spacer grid according to an exemplary embodiment of the present invention.

FIG. 1 is a schematic perspective view illustrating a truss-reinforced spacer grid according to an exemplary embodiment of the present invention, and FIG. 3 is a top plan view of FIG. 1.

As illustrated in FIGS. 1 and 3, the truss-reinforced spacer grid 1 according to an exemplary embodiment of the present invention includes a truss structure 10 and an external plate 20.

The truss structure 10 is composed of horizontal trusses 11, which are vertically disposed at regular intervals.

Figure 4:
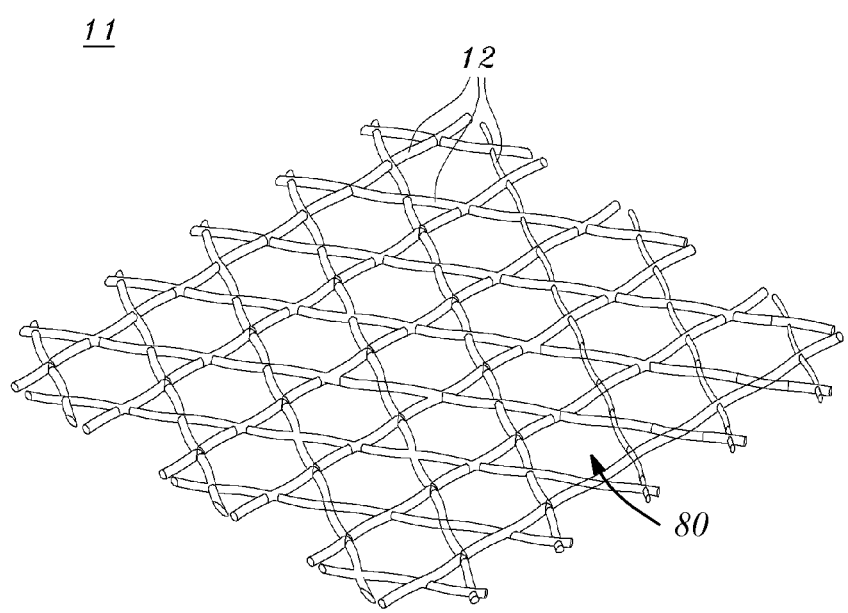
FIG. 4 is a perspective view illustrating a horizontal truss according to an exemplary embodiment of the present invention.

FIG. 4 is a perspective view illustrating a horizontal truss according to an exemplary embodiment of the present invention.

As illustrated in FIG. 4, the horizontal truss 11 is formed by weaving a plurality of truss members 12 in a horizontal direction.

Figure 12:
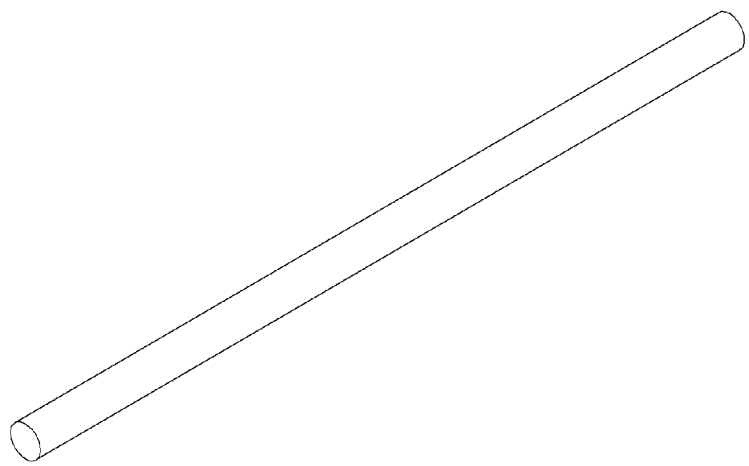
FIG. 12 is a perspective view illustrating a truss member according to an exemplary embodiment of the present invention.
Figure 13:
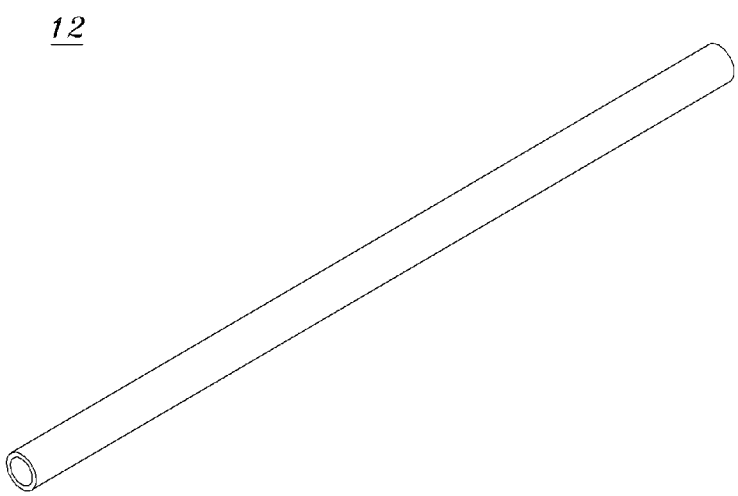
FIG. 13 is a perspective view illustrating a truss member according to another exemplary embodiment of the present invention.

FIGS. 12 and 13 are perspective views illustrating a truss member according to an exemplary embodiment of the present invention.

As illustrated in 12, the truss member 12 may be formed of a small diameter wire. As illustrated in FIG. 13, the truss member 12 may be formed of a hollow cylindrical pipe, an outer diameter of which ranges from 0.5 mm to 2.0 mm.

Accordingly, it is possible to improve the mixture of a coolant, the lateral impact strength, or supporting performance of a fuel rod.

Further, the truss member 12 may have a linear shape. Although not illustrated, the truss member 12 may have a circular shape curved at a predetermined curvature, or an angled shape bent at a predetermined angle.

The truss structure 10 includes a plurality of unit trusses having truss members 12 woven together. Here, the unit truss may assume a variety of shapes.

For example, the unit truss may be configured so that its center 80 (FIGS. 3 and 4) has the shape of a hexagon, and its surroundings outside the corresponding sides of the hexagon have the shape of a triangle.

In detail, three truss members 12 may be disposed on the same horizontal plane to form a first triangle, and other three truss members 12 may be disposed on the same horizontal plane to form a second triangle, and may be fastened to the first triangle in inverse relation to the first triangle. Thereby, a total of six truss members 12 may form the unit truss.

As described above, the truss structure 10 can be used only to enhance the enhance impact resistance and thermal hydraulic performance thereof, i.e. functional aspects of the spacer grid, without the fuel rod being inserted thereinto.

Alternatively, the truss structure 10 may be configured to surround the fuel rod when the fuel rod is inserted thereinto.

Figure 8:
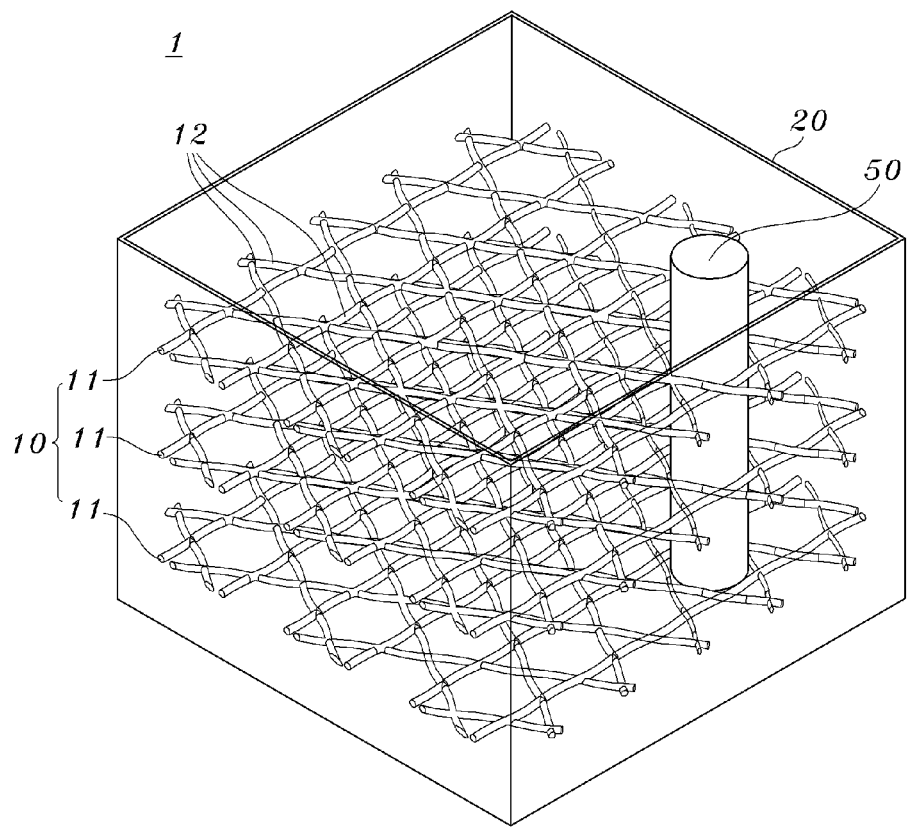
FIG. 8 is a schematic perspective view illustrating a truss-reinforced spacer grid, into which one fuel rod is inserted, according to an exemplary embodiment of the present invention.

FIG. 8 is a schematic perspective view illustrating a truss-reinforced spacer grid, into which one fuel rod is inserted, according to an exemplary embodiment of the present invention.

As illustrated in FIG. 8, the fuel rod 50 can be inserted into the truss structure 10. Here, the fuel rod 50 is inserted into and supported in a space formed by a grid center 80 of the unit truss.

When the unit truss supports the fuel rod 50, the truss members 12 are contracted (curved inwardly) in a central direction of the grid center 80 for receiving the fuel rod 50, and are deformed outwardly in a radial direction of the fuel rod 50 when the fuel rod 50 is inserted. As a result, the fuel rod 50 is supported by a frictional force between the truss members 12 and the fuel rod 50.

Thus, the truss structure 10 maintains a shape which does not change in the vertical direction, but it maintains a pattern which is repeated with a predetermined curvature in the transverse direction.

Figure 5:
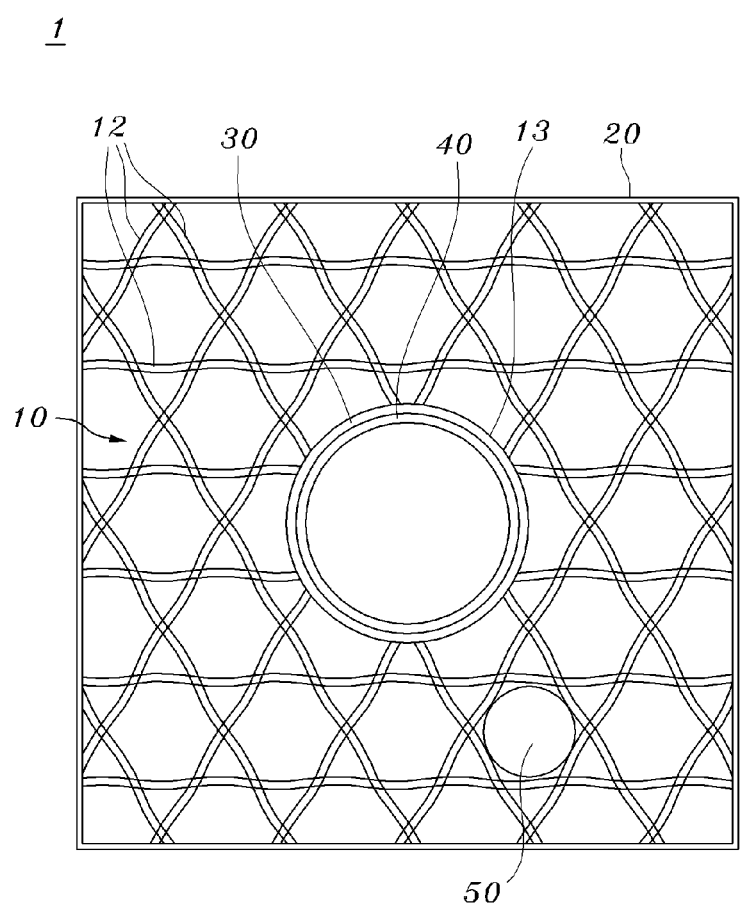
FIG. 5 is a top plan view illustrating a truss-reinforced spacer grid, into which one guide tube and one fuel rod are inserted, according to an exemplary embodiment of the present invention.
Figure 6:
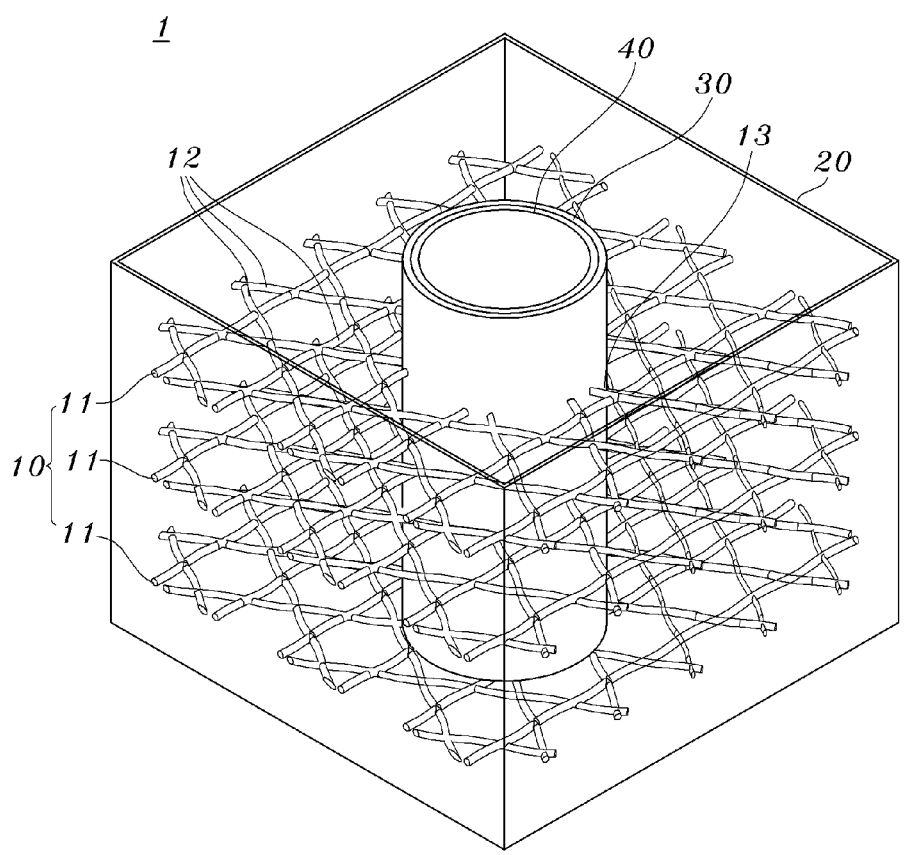
FIG. 6 is a schematic perspective view illustrating a truss-reinforced spacer grid, into which one guide tube is inserted, according to an exemplary embodiment of the present invention.
Figure 10:
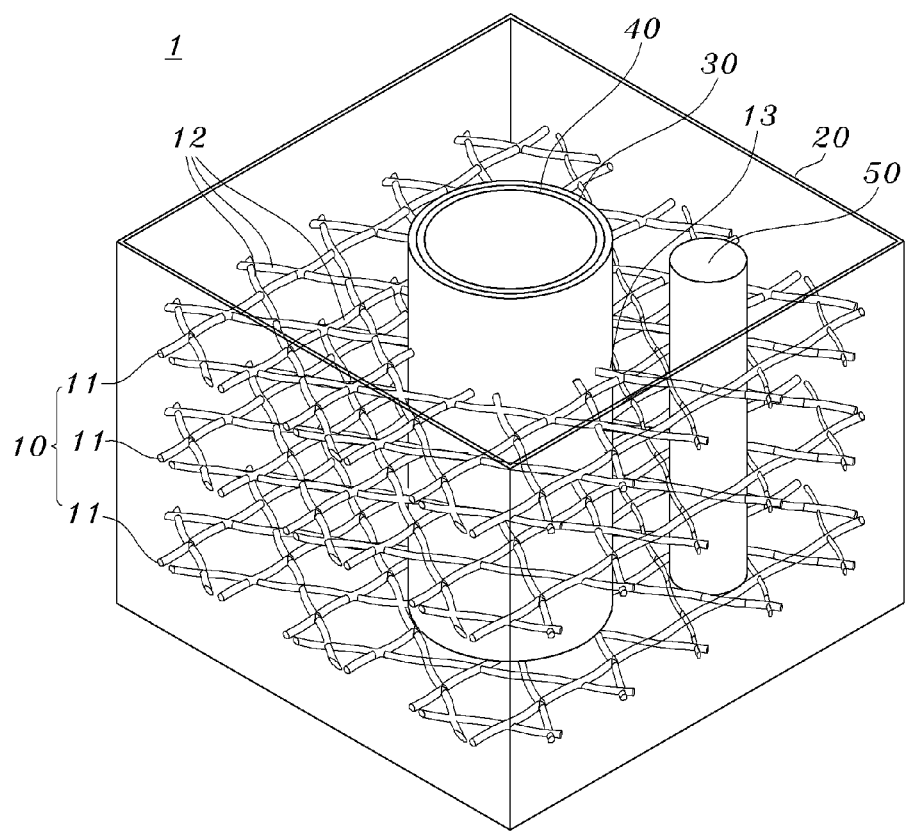
FIG. 10 is a schematic perspective view illustrating a truss-reinforced spacer grid, into which one guide tube and one fuel rod are inserted, according to an exemplary embodiment of the present invention.

FIG. 5 is a top plan view illustrating a truss-reinforced spacer grid, into which one guide tube and one fuel rod are inserted, according to an exemplary embodiment of the present invention. FIG. 6 is a schematic perspective view illustrating a truss-reinforced spacer grid, into which one guide tube is inserted, according to an exemplary embodiment of the present invention. FIG. 10 is a schematic perspective view illustrating a truss-reinforced spacer grid, into which one guide tube and one fuel rod are inserted, according to an exemplary embodiment of the present invention.

As illustrated in FIG. 6, a guide tube 40 (used as the passage for a control rod) may be inserted into the truss structure 10.

The truss structure 10 is provided with a guide tube hole 13 through which the guide tube 40 can be inserted. Here, a cylindrical sleeve 30 may be inserted between the guide tube hole 13 and the guide tube 40, and then the sleeve 30 may be coupled with the guide tube 40 by welding. The sleeve 30 may be inserted into the truss structure 10 from the top or bottom of the truss structure 10.

In addition, as illustrated in FIGS. 5 and 10, the fuel rod 50 and the guide tube 40 may be inserted into and supported by the truss structure 10, as described above.

As described above, the truss structure 10 collides with the coolant at various axial heights so as to render it possible to enhance the performance of mixing the coolant introduced from upstream in addition to its mechanical structural function, and thus the flow of the coolant is changed by the truss structure 10. As a result, the mixing performance of the coolant can be enhanced compared to a conventional spacer grid, and this flow strength can be comparatively maintained for a longer time.

Meanwhile, the external plate 20 surrounds the truss structure 10, and is joined with ends of the horizontal trusses 11. Thereby, the truss structure 10 is coupled with the external plate 20.

Thus, the truss structure 10 coupled with the external plate 20 can resist lateral impact load.

Hereinafter, another truss-reinforced spacer grid according to another exemplary embodiment of the present invention will be described in detail.

Figure 2:
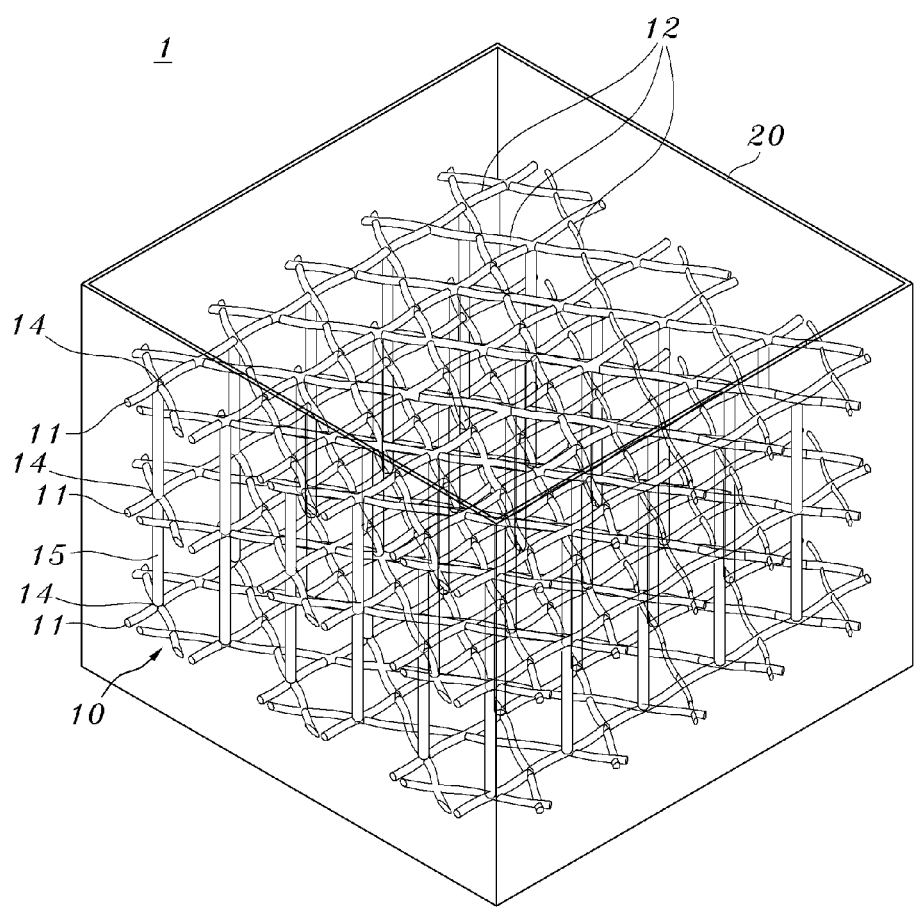
FIG. 2 is a schematic perspective view illustrating a truss-reinforced spacer grid according to another exemplary embodiment of the present invention.

FIG. 2 is a schematic perspective view illustrating a truss-reinforced spacer grid according to another exemplary embodiment of the present invention.

As illustrated in FIG. 2, the truss-reinforced spacer grid according to another exemplary embodiment of the present invention includes a truss structure 10 and an external plate 20. Here, the external plate 20 according to another exemplary embodiment has the same configuration as that of the truss-reinforced spacer grid 1 according to an exemplary embodiment.

The truss structure 10 includes horizontal trusses 11 and vertical trusses 15.

The horizontal truss 11 according to another exemplary embodiment has the same configuration as that of the truss-reinforced spacer grid 1 according to an exemplary embodiment.

The vertical trusses 15 are vertically fastened to truss intersections 14 of the horizontal trusses 11 vertically disposed at regular intervals.

Here, each vertical truss 15 may be formed of a truss member 12. The truss member 12 according to another exemplary embodiment may have the same configuration as that used for the truss-reinforced spacer grid 1 according to an exemplary embodiment.

Thus, as illustrated in FIG. 12, the vertical truss 15 may be formed of a wire having a small diameter. As illustrated in FIG. 13, the vertical truss 15 may be formed of a hollow cylindrical pipe.

Figure 7:
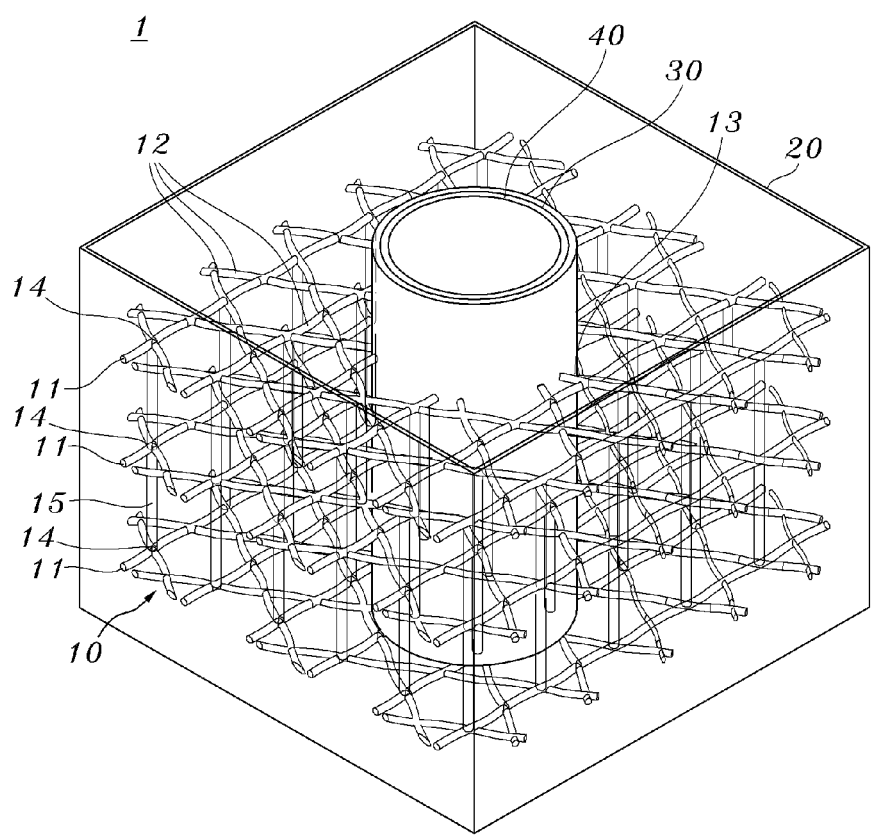
FIG. 7 is a schematic perspective view illustrating a truss-reinforced spacer grid, into which one guide tube is inserted, according to another exemplary embodiment of the present invention.
Figure 9:
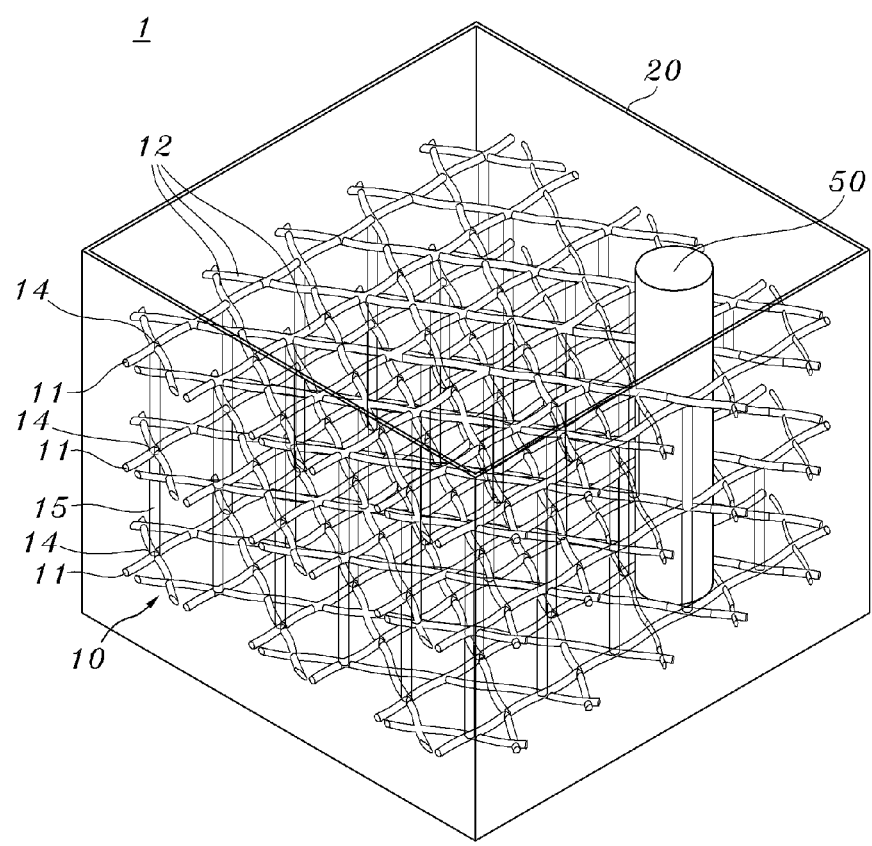
FIG. 9 is a perspective view illustrating a truss-reinforced spacer grid, into which one fuel rod is inserted, according to another exemplary embodiment of the present invention.
Figure 11:
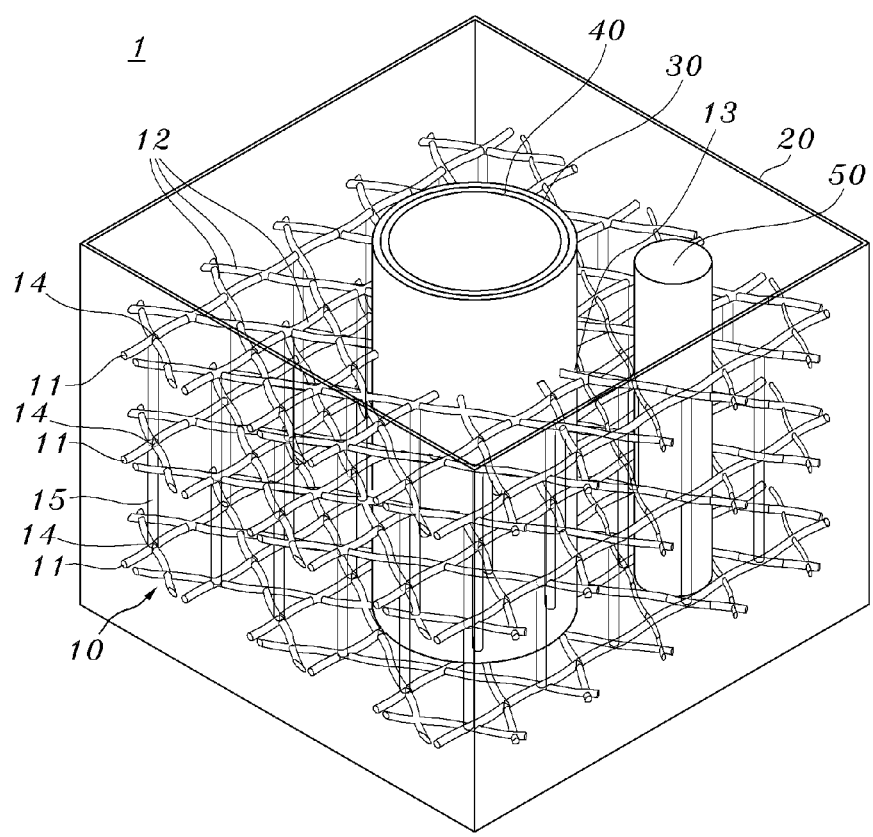
FIG. 11 is a perspective view illustrating a truss-reinforced spacer grid, into which one guide tube and one fuel rod are inserted, according to another exemplary embodiment of the present invention.

FIG. 7 is a schematic perspective view illustrating a truss-reinforced spacer grid, into which one guide tube is inserted, according to another exemplary embodiment of the present invention. FIG. 9 is a perspective view illustrating a truss-reinforced spacer grid, into which one fuel rod is inserted, according to another exemplary embodiment of the present invention. FIG. 11 is a perspective view illustrating a truss-reinforced spacer grid, into which one guide tube and one fuel rod are inserted, according to another exemplary embodiment of the present invention.

Similar to the truss structure of the truss-reinforced spacer grid 1 according to an exemplary embodiment of the present invention, the truss structure 10 according to another exemplary embodiment allows a guide tube 40 to be inserted therein as illustrated in FIG. 7, a fuel rod 40 as illustrated in FIG. 9, or the guide tube 40 and the fuel rod 59 as illustrated in FIG. 11.

Hereinafter, a method of forming a truss-reinforced spacer grid according to an exemplary embodiment of the present invention will be described in detail.

Figure 14:
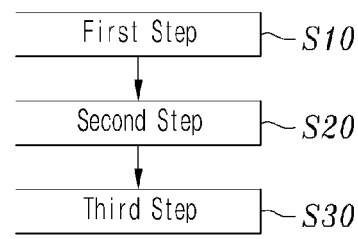
FIG. 14 is a block diagram illustrating a method of forming a truss-reinforced spacer grid according to an exemplary embodiment of the present invention.
Figure 17:
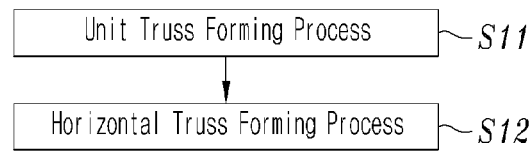
FIG. 17 is a block diagram illustrating the first step in a method of forming a truss-reinforced spacer grid according to an exemplary embodiment of the present invention.
Figure 18:
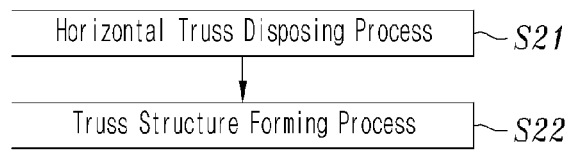
FIG. 18 is a block diagram illustrating the second step in a method of forming a truss-reinforced spacer grid according to an exemplary embodiment of the present invention.

FIG. 14 is a block diagram illustrating a method of forming a truss-reinforced spacer grid according to an exemplary embodiment of the present invention, FIG. 17 is a block diagram illustrating the first step of a method of forming a truss-reinforced spacer grid according to an exemplary embodiment of the present invention, and FIG. 18 is a block diagram illustrating the second step of a method of forming a truss-reinforced spacer grid according to an exemplary embodiment of the present invention.

As illustrated in FIG. 14, the method of forming a truss-reinforced spacer grid according to an exemplary embodiment of the present invention includes a first step S10, a second step S20, and a third step S30.

As illustrated in FIG. 4, the first step S10 is the step wherein a plurality of truss members 12 are horizontally woven to form horizontal trusses 11.

As illustrated in FIG. 17, the first step S10 includes a process S11 of forming unit trusses and a process S12 of forming the horizontal trusses.

The unit truss forming process S11 is a process of horizontally weaving the truss members 12 to form the unit trusses.

Here, as illustrated in FIG. 12, each truss member 12 may be formed of a small diameter wire. As illustrated in FIG. 13, each truss member 12 may be formed of a hollow cylindrical pipe. The unit truss may adopt a variety of shapes.

The horizontal truss forming process S12 is a process of joining the unit trusses using brazing to form the horizontal trusses 11.

Accordingly, compared to a conventional spacer grid forming method in which grid plates are crossed, fitted and welded at their contact portions, the number of processes is remarkably reduced.

As illustrated in FIG. 2, the second step S20 is a step of vertically fastening the vertical trusses 15 to the horizontal trusses 11 to form the truss structure 10.

As illustrated in FIG. 18, the second step S20 includes a process S21 of vertically disposing the horizontal trusses and a process S22 of forming the truss structure.

As illustrated in FIG. 2, the horizontal truss disposing process S21 is a process used to vertically dispose the horizontal trusses 11 at regular intervals.

The truss structure forming process S22 is a process of vertically fastening the vertical trusses 15 to vertically corresponding truss intersections 14 of the horizontal trusses 11 to form the truss structure 10.

Here, as illustrated in FIG. 12, each vertical truss 15 may be formed of a small diameter wire. As illustrated in FIG. 13, each vertical truss 15 may be formed of a hollow cylindrical pipe.

The third step S30 is a step of joining the ends of the horizontal trusses 11 to the external plate 20 surrounding the truss structure 10 to form the truss-reinforced spacer grid 1.

Here, the horizontal trusses 11 may be joined to the external plate 20 by brazing.

Figure 15:
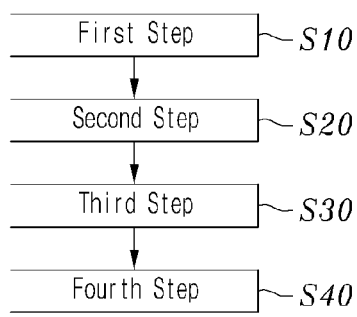
FIG. 15 is a block diagram illustrating another method of forming a truss-reinforced spacer grid according to an exemplary embodiment of the present invention.
Figure 19:
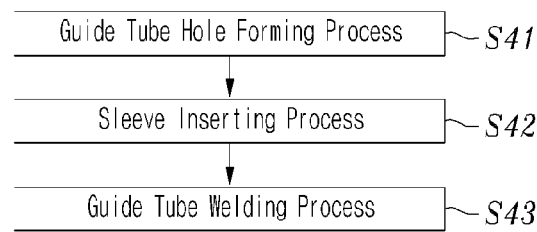
FIG. 19 is a block diagram illustrating the fourth step in a method of forming a truss-reinforced spacer grid according to an exemplary embodiment of the present invention.
Figure 20:
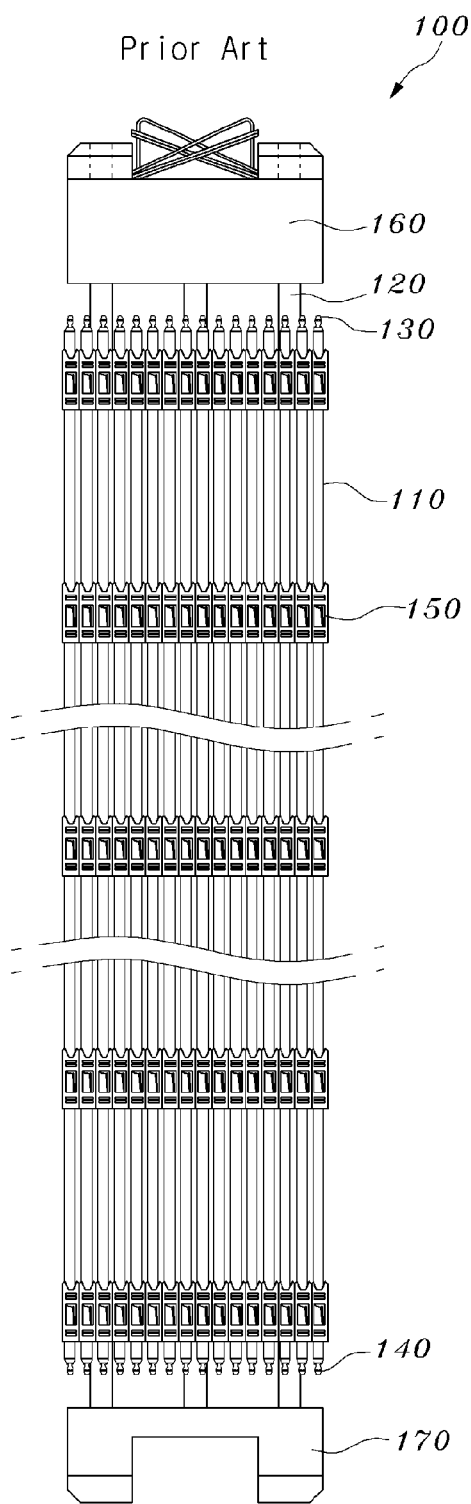
FIG. 20 is a schematic front view illustrating a conventional nuclear fuel assembly having fuel rods.
Figure 21:
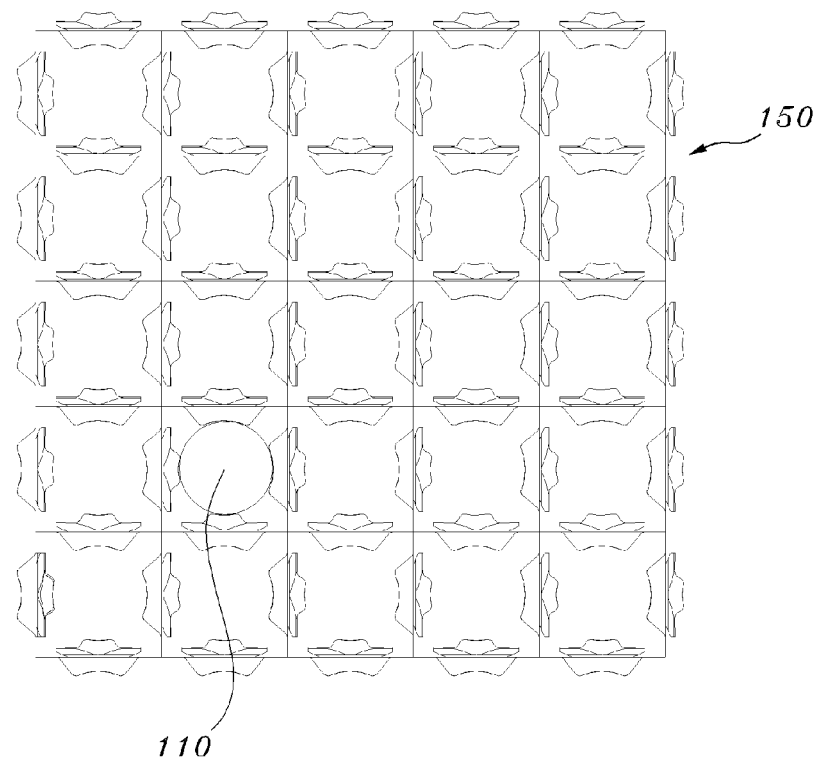
FIG. 21 is a schematic top plan view illustrating a conventional spacer grid.
Figure 22:
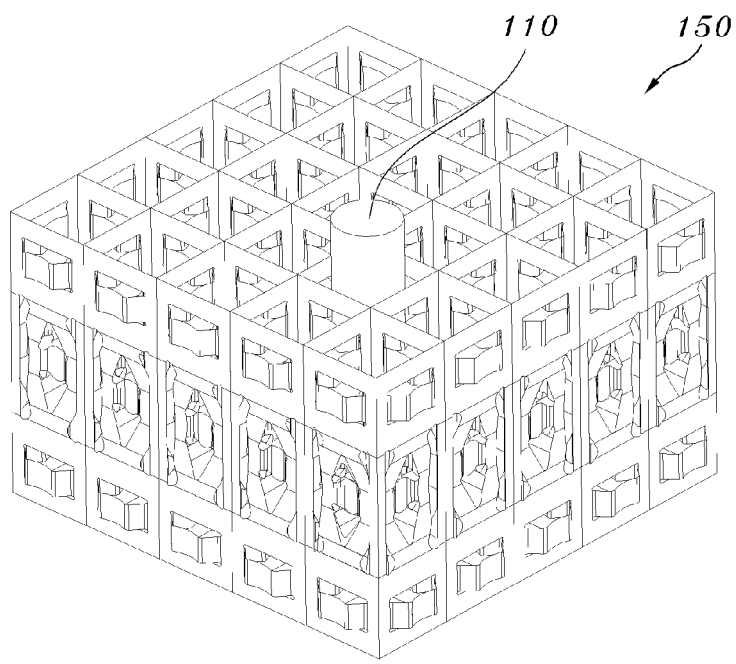
FIG. 22 is a perspective view illustrating a conventional spacer grid.

FIG. 15 is a block diagram illustrating another method of forming a truss-reinforced spacer grid according to an exemplary embodiment of the present invention, and FIG. 19 is a block diagram illustrating the fourth step in a method of forming a truss-reinforced spacer grid according to an exemplary embodiment of the present invention.

Meanwhile, as illustrated in FIG. 15, the method of forming a truss-reinforced spacer grid according to an exemplary embodiment of the present invention may include a fourth step S40 following the third step S30.

As illustrated in FIG. 7, the fourth step S40 is the step wherein the guide tube 40 is inserted into the truss structure 10.

As illustrated in FIG. 19, the fourth step S40 includes a process S41 of forming a hole for the guide tube, a process S42 of inserting a sleeve, and a process S43 of welding the guide tube.

The guide tube hole forming (cutting) process S41 is a process of forming a hole having a diameter greater than that of the guide tube 40 in the truss structure 10.

The sleeve inserting process S42 is a process of inserting the cylindrical sleeve 30 into the guide tube hole 13. Here, the sleeve 30 may be inserted from the top or bottom of the truss structure 10 into the truss structure 10.

The guide tube welding process S43 is a process of inserting the guide tube 40 into the cylindrical sleeve 30 and then welding the sleeve 30 and the guide tube 40.

Here, the sleeve 30 and the guide tube 40 may be joined by laser welding.

Figure 16:
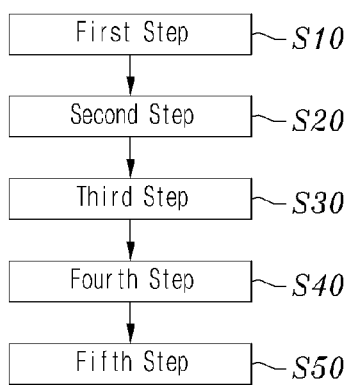
FIG. 16 is a block diagram illustrating yet another method of forming a truss-reinforced spacer grid according to an exemplary embodiment of the present invention.

FIG. 16 is a block diagram illustrating yet another method of forming a truss-reinforced spacer grid according to an exemplary embodiment of the present invention.

Meanwhile, as illustrated in FIG. 16, the method of forming a truss-reinforced spacer grid according to an exemplary embodiment of the present invention may include a fifth step S50 following the fourth step S40.

As illustrated in FIG. 9, the fifth step S50 is the step wherein the fuel rods 50 are inserted into the truss structure 10.

Thus, each fuel rod 50 can be supported by the frictional force between it and the truss members 12 included in the truss structure 10.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A truss-reinforced nuclear fuel rod spacer grid comprising:
   a truss structure in which horizontal trusses formed by horizontally weaving a plurality of truss members are vertically disposed at regular intervals; and
   an external plate joined with ends of the horizontal trusses and surrounding the truss structure to vertically join the horizontal trusses to each other,
   wherein:
   the truss structure includes vertical trusses, which are vertically fastened to vertically corresponding truss intersections of the horizontal trusses to vertically support the horizontal trusses at regular intervals within an interior of the spacer grid;
   the horizontal trusses are shaped around a hexagon shaped space; and
   the horizontal trusses are configured to deform outwardly and apply a frictional force on a nuclear fuel rod upon insertion of the nuclear fuel rod.

2. The truss-reinforced spacer grid as set forth in claim 1, wherein the truss structure includes unit trusses, each of which has a shape of a hexagon in the center thereof and a shape of a triangle outside corresponding sides of the hexagon.

3. The truss-reinforced spacer grid as set forth in claim 2, wherein the truss structure is configured to support said fuel rods inserted into the unit trusses.

4. The truss-reinforced spacer grid as set forth in claim 1, wherein the truss structure includes a guide tube hole configured for a guide tube wherein the guide tube is configured to accept a control rod.

5. The truss-reinforced spacer grid as set forth in claim 4, wherein the guide tube is surrounded by a cylindrical sleeve, the sleeve and the guide tube being welded.

6. The truss-reinforced spacer grid as set forth in claim 1, wherein each truss member is formed of a wire.

7. The truss-reinforced spacer grid as set forth in claim 1, wherein the hollow cylindrical pipe has an outer diameter of 0.5 mm to 2.0 mm.

8. The truss-reinforced spacer grid as set forth in claim 1, wherein each truss member has a linear shape.

9. The truss-reinforced spacer grid as set forth in claim 1, wherein each truss member has a circular shape curved at a predetermined curvature.

10. The truss-reinforced spacer grid as set forth in claim 1, wherein each truss member has an angled shape bent at a predetermined angle.

11. A method of manufacturing the truss-reinforced spacer grid of claim 1, the method, comprising:
   a first step of horizontally weaving said plurality of truss members to form said horizontal trusses;
   a second step of fastening said vertical trusses to the horizontal trusses to form said truss structure; and
   a third step of joining said ends of the horizontal trusses to said external plate surrounding the truss structure to form the truss-reinforced spacer grid.

12. The method as set forth in claim 11, wherein the first step includes:
   a process of weaving the truss members to form unit trusses; and
   a process of joining the unit trusses using brazing to form the horizontal trusses.

13. The method as set forth in claim 11, wherein the second step includes:
   a process of vertically disposing the horizontal trusses at the same separation height; and
   a process of vertically fastening the vertical trusses to vertically corresponding truss intersections of the horizontal trusses to form the truss structure.

14. The method as set forth in claim 11, wherein the third step includes joining the horizontal trusses to the external plate using brazing.

15. The method as set forth in claim 11, further comprising a fourth step of inserting a guide tube into the truss structure.

16. The method as set forth in claim 15, wherein the fourth step includes:
   a process of forming a guide tube hole in the truss structure, the guide tube hole having a diameter greater than that of the guide tube;
   a process of inserting a cylindrical sleeve into the guide tube hole; and
   a process of inserting the guide tube into the cylindrical sleeve and welding the sleeve and the guide tube.

17. The method as set forth in claim 11, further comprising a fifth step of inserting fuel rods into the truss structure.

18. A truss-reinforced nuclear fuel rod spacer grid comprising:
   a truss structure in which horizontal trusses formed by horizontally weaving a plurality of truss members are vertically disposed at regular intervals, wherein:
      the horizontal trusses are shaped around a hexagon shaped space;
      the horizontal trusses are configured to deform outwardly and apply frictional force on a nuclear fuel rod upon insertion of the nuclear fuel rod; and
   an external plate joined with ends of the horizontal trusses and surrounding the truss structure and wherein the truss structure includes a cut guide tube hole configured for a guide tube wherein the guide tube is configured to accept a control rod.

19. The truss-reinforced spacer grid as set forth in claim 18, wherein the guide tube is surrounded by a cylindrical sleeve, the sleeve and the guide tube being welded.

20. A truss-reinforced nuclear fuel rod spacer grid comprising:
   a truss structure in which horizontal trusses formed by horizontally weaving a plurality of truss members are vertically disposed at regular intervals, wherein:
      the horizontal trusses are shaped around a hexagon shaped space;
      the horizontal trusses are configured to deform outwardly and apply frictional force on a nuclear fuel rod upon insertion of the nuclear fuel rod; and
   an external plate joined with ends of the horizontal trusses and surrounding the truss structure and wherein each truss member is formed of a hollow cylindrical pipe.

21. The truss-reinforced spacer grid as set forth in claim 20, wherein the hollow cylindrical pipe has an outer diameter of 0.5 mm to 2.0 mm.

* * * * *